(12) United States Patent
Wilson (10) Patent No.: US 12,136,837 B1
(45) Date of Patent: Nov. 5, 2024

(54) CHARGE BALANCING OF PARALLEL STRINGS WITH ZENER DIODE AND LIGHT EMITTING DIODE BETWEEN CELL TERMINAL OF THE BATTERY STRINGS

(71) Applicant: Bobbie Wilson, Columbia, SC (US)

(72) Inventor: Bobbie Wilson, Columbia, SC (US)

( * ) Notice: Subject to any disclaimer, the term of this patent is extended or adjusted under 35 U.S.C. 154(b) by 410 days.

(21) Appl. No.: 17/114,597

(22) Filed: Dec. 8, 2020

(51) Int. Cl.
| | |
|---|---|
| H02J 7/00 | (2006.01) |
| H01M 10/44 | (2006.01) |
| H01M 10/48 | (2006.01) |
| H02J 7/35 | (2006.01) |

(52) U.S. Cl.
CPC ......... *H02J 7/0014* (2013.01); *H01M 10/441* (2013.01); *H01M 10/482* (2013.01); *H01M 10/488* (2013.01); *H02J 7/35* (2013.01); *H02J 2300/22* (2020.01)

(58) Field of Classification Search
CPC .. H02J 7/0014; H01M 10/441; H01M 10/482; H01M 10/488
USPC .......................................................... 320/137
See application file for complete search history.

(56) References Cited

U.S. PATENT DOCUMENTS

| | | | | |
|---|---|---|---|---|
| 3,875,464 A | * | 4/1975 | Gary .................. | H02H 3/06 361/100 |
| 4,020,243 A | * | 4/1977 | Oldford .............. | H01M 6/5044 324/426 |
| 4,034,762 A | * | 7/1977 | Cosens ................ | A61B 18/12 606/50 |
| 4,052,695 A | * | 10/1977 | Myers .................. | B60Q 1/44 324/426 |
| 4,066,996 A | * | 1/1978 | Davis .................. | B60T 7/20 340/687 |
| 4,146,825 A | * | 3/1979 | Harhay ................ | H02J 7/02 320/DIG. 22 |
| 4,214,288 A | * | 7/1980 | Cavil .................. | B60L 3/00 361/194 |
| 4,224,383 A | * | 9/1980 | Taylor ................ | H01M 50/289 429/7 |

(Continued)

FOREIGN PATENT DOCUMENTS

| | | | | | |
|---|---|---|---|---|---|
| CN | 110556894 A | * | 12/2019 | ............ | H02J 7/0019 |
| FR | 2680249 A1 | * | 2/1993 | ....... | G01R 19/16542 |

(Continued)

*Primary Examiner* — John T Trischler (57) ABSTRACT

The battery-charging system is an electric circuit. The battery-charging system is an electrochemical device. The battery-charging system converts chemical potential energy into electrical energy used to power an electric load. The battery-charging system comprises a power distribution circuit and a regeneration circuit. The power distribution circuit generates a plurality of specified voltage values that are capable of meeting a plurality of input voltage specifications. The power distribution is capable of simultaneously supplying electric energy to a plurality of electric loads. The power distribution circuit further comprises an electric circuit that redistributes the chemical potential energy stored within the power distribution circuit to match the electrical energy needs of the plurality of electric loads. The regeneration circuit recharges the power distribution circuit. The plurality of diodes are connected between parallel battery strings each comprising battery cells.

14 Claims, 2 Drawing Sheets

(56) References Cited

U.S. PATENT DOCUMENTS

| | | | | |
|---|---|---|---|---|
| 4,238,722 A * | 12/1980 | Ford | ............... | H02H 11/006 |
| | | | | 320/DIG. 15 |
| 4,307,606 A * | 12/1981 | Johnson | ............... | G01F 23/247 |
| | | | | 374/189 |
| 4,345,304 A * | 8/1982 | Penney | ............... | F21L 4/085 |
| | | | | 362/183 |
| 4,354,182 A * | 10/1982 | Frey | ............... | G01R 31/006 |
| | | | | 340/455 |
| 4,374,380 A * | 2/1983 | Giepen | ............... | H02J 7/16 |
| | | | | 340/645 |
| 4,463,283 A * | 7/1984 | Penney | ............... | F21L 4/085 |
| | | | | 315/86 |
| 4,571,533 A * | 2/1986 | Dey | ............... | H02J 7/00302 |
| | | | | 320/DIG. 20 |
| 4,930,997 A * | 6/1990 | Bennett | ............... | A61M 1/84 |
| | | | | 604/319 |
| 4,943,770 A * | 7/1990 | Ashley-Rollman | .... | G01V 3/107 |
| | | | | 128/207.14 |
| 4,973,896 A * | 11/1990 | Shiga | ............... | H02P 9/30 |
| | | | | 290/40 C |
| 5,028,858 A * | 7/1991 | Schnizler | ............... | B23B 45/02 |
| | | | | 320/136 |
| 5,043,650 A * | 8/1991 | Bhagwat | ............... | H02J 7/02 |
| | | | | 320/164 |
| 5,117,173 A * | 5/1992 | Oliva | ............... | H01M 10/48 |
| | | | | 320/160 |
| 5,180,963 A * | 1/1993 | El-Sharkawi | ............... | G05F 1/70 |
| | | | | 323/902 |
| 5,200,644 A * | 4/1993 | Kobayashi | ............... | H02J 9/061 |
| | | | | 307/103 |
| 5,291,116 A * | 3/1994 | Feldstein | ............... | H02J 7/0018 |
| | | | | 320/125 |
| 5,343,135 A * | 8/1994 | Mathieson | ............... | H02J 7/0034 |
| | | | | 320/DIG. 15 |
| 5,493,196 A * | 2/1996 | Feldstein | ............... | H02J 7/0018 |
| | | | | 320/132 |
| 5,545,933 A * | 8/1996 | Okamura | ............... | H02J 7/0013 |
| | | | | 361/300 |
| 5,982,050 A * | 11/1999 | Matsui | ............... | H02J 7/0016 |
| | | | | 340/636.15 |
| 6,043,501 A * | 3/2000 | Franckart | ............... | B61L 1/20 |
| | | | | 246/28 F |
| 6,081,101 A * | 6/2000 | Yang | ............... | H02J 7/007194 |
| | | | | 320/154 |
| 6,160,375 A * | 12/2000 | Horie | ............... | H02J 7/0048 |
| | | | | 320/122 |
| 6,226,190 B1 * | 5/2001 | Balakrishnan | .... | H02M 3/33507 |
| | | | | 363/21.13 |
| 6,229,349 B1 * | 5/2001 | Franckart | ............... | G08B 29/16 |
| | | | | 327/80 |
| 6,275,011 B1 * | 8/2001 | Yang | ............... | H02J 7/007194 |
| | | | | 320/150 |
| 6,331,763 B1 * | 12/2001 | Thomas | ............... | H02H 9/042 |
| | | | | 320/136 |
| 6,356,055 B1 * | 3/2002 | Lin | ............... | H02J 7/0016 |
| | | | | 320/124 |
| 6,433,508 B1 * | 8/2002 | Yang | ............... | G06F 1/263 |
| | | | | 320/103 |
| 6,518,731 B2 * | 2/2003 | Thomas | ............... | H02J 7/00308 |
| | | | | 320/135 |
| 6,628,085 B2 * | 9/2003 | Yang | ............... | H05B 45/40 |
| | | | | 315/169.3 |
| 6,673,217 B2 * | 1/2004 | Danylyk | ............... | C02F 1/46 |
| | | | | 210/223 |
| 6,680,600 B2 * | 1/2004 | Emori | ............... | H01M 16/00 |
| | | | | 320/126 |
| 6,700,349 B2 * | 3/2004 | Emori | ............... | B60L 58/22 |
| | | | | 320/104 |
| 6,747,438 B2 * | 6/2004 | Emori | ............... | B60L 58/20 |
| | | | | 320/126 |
| 6,873,133 B1 * | 3/2005 | Kavounas | ............... | H02J 7/0024 |
| | | | | 320/103 |
| 6,884,934 B2 * | 4/2005 | Tsuzuki | ............... | H02J 3/381 |
| | | | | 310/303 |
| 6,914,416 B2 * | 7/2005 | Thomas | ............... | H02J 7/00304 |
| | | | | 361/720 |
| 6,917,181 B2 * | 7/2005 | Emori | ............... | H01M 10/441 |
| | | | | 320/104 |
| 6,950,030 B2 * | 9/2005 | Kovarik | ............... | G01R 31/388 |
| | | | | 340/815.4 |
| 6,977,480 B2 * | 12/2005 | Emori | ............... | H01M 16/00 |
| | | | | 320/104 |
| 7,054,139 B2 * | 5/2006 | James | ............... | H01G 9/10 |
| | | | | 429/247 |
| 7,233,482 B2 * | 6/2007 | James | ............... | H01G 2/06 |
| | | | | 29/25.03 |
| 7,525,320 B2 * | 4/2009 | Takami | ............... | A61B 1/00032 |
| | | | | 348/45 |
| 7,554,790 B2 * | 6/2009 | James | ............... | H01G 2/06 |
| | | | | 361/523 |
| 7,571,683 B2 * | 8/2009 | Kumar | ............... | B60L 50/51 |
| | | | | 105/49 |
| 7,847,512 B2 * | 12/2010 | Carroll | ............... | H02S 10/00 |
| | | | | 320/135 |
| 7,854,203 B2 * | 12/2010 | Kumar | ............... | B60L 15/2045 |
| | | | | 105/49 |
| 7,880,434 B2 * | 2/2011 | White | ............... | H02J 7/0068 |
| | | | | 320/134 |
| RE42,333 E * | 5/2011 | Yang | ............... | G06F 1/26 |
| | | | | 320/103 |
| 7,989,106 B2 * | 8/2011 | Kinoshita | ........ | H01M 10/4257 |
| | | | | 429/162 |
| 8,004,233 B2 * | 8/2011 | Carroll | ............... | H02S 10/00 |
| | | | | 320/135 |
| 8,054,004 B2 * | 11/2011 | Yang | ............... | H05B 45/3725 |
| | | | | 315/307 |
| 8,058,814 B2 * | 11/2011 | Yang | ............... | H05B 45/42 |
| | | | | 315/307 |
| 8,063,582 B2 * | 11/2011 | Yang | ............... | H05B 45/37 |
| | | | | 315/307 |
| 8,063,587 B2 * | 11/2011 | Yang | ............... | H05B 45/37 |
| | | | | 315/307 |
| 8,067,901 B2 * | 11/2011 | Yang | ............... | H05B 45/37 |
| | | | | 315/307 |
| 8,264,204 B2 * | 9/2012 | Nagaoka | ............... | B60L 58/22 |
| | | | | 320/136 |
| 8,330,419 B2 * | 12/2012 | Kim | ............... | H01M 10/4257 |
| | | | | 320/120 |
| 8,386,102 B2 * | 2/2013 | Gullichsen | ............... | B60L 58/19 |
| | | | | 340/584 |
| 8,427,106 B2 * | 4/2013 | Kim | ............... | H01M 10/482 |
| | | | | 320/120 |
| 8,570,047 B1 * | 10/2013 | Davies | ............... | H02J 7/0019 |
| | | | | 324/426 |
| 8,575,848 B2 * | 11/2013 | Yang | ............... | H05B 45/44 |
| | | | | 315/192 |
| 8,816,613 B2 * | 8/2014 | Lee | ............... | B60L 3/0046 |
| | | | | 318/140 |
| 8,823,323 B2 * | 9/2014 | Troxel | ............... | H01M 10/482 |
| | | | | 320/118 |
| 8,884,585 B2 * | 11/2014 | Troxel | ............... | H01M 10/4207 |
| | | | | 320/132 |
| 8,896,315 B1 * | 11/2014 | Davies | ............... | H02J 7/0016 |
| | | | | 320/120 |
| 8,933,665 B2 * | 1/2015 | Athas | ............... | H02J 7/0016 |
| | | | | 320/167 |
| 9,083,188 B2 * | 7/2015 | Nakao | ............... | H02J 7/0018 |
| 9,182,771 B2 * | 11/2015 | Butler | ............... | H04B 5/0037 |
| 9,233,612 B2 * | 1/2016 | Kumar | ............... | B60L 9/02 |
| 9,350,160 B2 * | 5/2016 | Zara | ............... | H02H 3/207 |
| 9,496,739 B2 * | 11/2016 | Peterson | ............... | H02J 7/0025 |
| 9,537,326 B2 * | 1/2017 | Troxel | ............... | H01M 10/488 |
| 9,601,932 B2 * | 3/2017 | Athas | ............... | H02M 3/07 |
| 9,739,429 B2 * | 8/2017 | Bah | ............... | F21L 4/08 |
| 9,775,609 B2 * | 10/2017 | Shelton, IV | ........... | G16H 40/63 |
| RE46,752 E * | 3/2018 | Yang | ............... | H05B 45/44 |
| 9,929,771 B2 * | 3/2018 | Rose | ............... | H04B 1/40 |
| 9,929,772 B2 * | 3/2018 | Rose | ............... | H02J 7/0014 |

(56) References Cited

U.S. PATENT DOCUMENTS

| | | | |
|---|---|---|---|
| 9,966,758 B2* | 5/2018 | Nordin | H02J 9/061 |
| 10,044,182 B2* | 8/2018 | Takahashi | H02J 7/0013 |
| 10,160,326 B2* | 12/2018 | Chung | H01M 10/44 |
| 10,193,192 B2* | 1/2019 | Gagneur | H01M 10/482 |
| 10,230,246 B2* | 3/2019 | Troxel | H01M 10/482 |
| 10,284,251 B2* | 5/2019 | Rose | H03F 3/24 |
| 10,343,552 B2* | 7/2019 | Ashcraft | H02J 7/1423 |
| 10,371,756 B2* | 8/2019 | Kurosaki | H02J 7/06 |
| 10,374,444 B2* | 8/2019 | Worry | H01M 10/425 |
| 10,439,196 B2* | 10/2019 | Bourns | H02H 9/026 |
| 10,441,281 B2* | 10/2019 | Shelton, IV | G16H 40/63 |
| 10,498,145 B2* | 12/2019 | Gagneur | H02J 7/0014 |
| 10,516,263 B2* | 12/2019 | Nordin | H02J 7/0016 |
| 10,536,185 B2* | 1/2020 | Rose | H04B 1/0475 |
| 10,898,190 B2* | 1/2021 | Yates | H02J 7/0068 |
| 10,981,451 B2* | 4/2021 | Tzivanopoulos | G01R 31/58 |
| 11,025,291 B2* | 6/2021 | Rose | H04B 1/44 |
| 11,152,872 B2* | 10/2021 | Chen | H02M 7/5387 |
| 11,248,893 B2* | 2/2022 | Rastegar | F42C 11/008 |
| 11,289,918 B2* | 3/2022 | Troxel | H01M 10/482 |
| 11,289,921 B1* | 3/2022 | Hall | H02J 7/0014 |
| 11,349,319 B2* | 5/2022 | White | H02J 7/0048 |
| 11,381,094 B2* | 7/2022 | Park | H02J 7/0029 |
| 11,504,119 B2* | 11/2022 | Shelton, IV | A61B 34/30 |
| 11,595,076 B2* | 2/2023 | Rose | G01D 4/004 |
| 2002/0079865 A1* | 6/2002 | Thomas | H02J 7/00308 320/136 |
| 2002/0089307 A1* | 7/2002 | Yang | G06F 1/263 320/116 |
| 2002/0117975 A1* | 8/2002 | Yang | H05B 45/56 315/291 |
| 2003/0010373 A1* | 1/2003 | Tsuzuki | H02J 3/381 136/244 |
| 2003/0094923 A1* | 5/2003 | Emori | B60L 53/11 320/126 |
| 2003/0094926 A1* | 5/2003 | Emori | B60L 53/11 320/148 |
| 2003/0094928 A1* | 5/2003 | Emori | B60L 58/22 320/162 |
| 2003/0132732 A1* | 7/2003 | Thomas | H02J 7/00308 320/134 |
| 2003/0137304 A1* | 7/2003 | Danylyk | C02F 1/46 324/427 |
| 2003/0223227 A1* | 12/2003 | Levine | F21L 4/08 362/399 |
| 2004/0046673 A1* | 3/2004 | Kovarik | G01R 31/388 324/435 |
| 2004/0052014 A1* | 3/2004 | James | H01G 11/52 361/15 |
| 2004/0119444 A1* | 6/2004 | Faure | H02J 7/00302 320/134 |
| 2004/0124716 A1* | 7/2004 | Shirato | H02M 3/155 307/130 |
| 2004/0145346 A1* | 7/2004 | Hall | H02J 7/0016 320/116 |
| 2004/0160209 A1* | 8/2004 | Emori | B60L 58/15 320/104 |
| 2005/0052154 A1* | 3/2005 | Kavounas | H02J 7/345 320/116 |
| 2005/0057221 A1* | 3/2005 | Desilvestro | H02J 7/0014 320/119 |
| 2005/0083722 A1* | 4/2005 | Emori | H02J 7/0014 365/149 |
| 2005/0156578 A1* | 7/2005 | Kamenoff | H02J 7/0048 320/165 |
| 2005/0162130 A1* | 7/2005 | Petitdidier | H02J 7/0016 320/119 |
| 2005/0235865 A1* | 10/2005 | Kumar | B60L 50/53 105/61 |
| 2005/0258805 A1* | 11/2005 | Thomas | H02J 7/0031 320/134 |
| 2006/0193104 A1* | 8/2006 | James | H01G 11/82 361/502 |
| 2006/0232667 A1* | 10/2006 | Takami | A61B 1/0684 348/69 |
| 2007/0188126 A1* | 8/2007 | Dickson | H02J 7/0045 320/104 |
| 2007/0195487 A1* | 8/2007 | James | H01G 11/74 361/502 |
| 2007/0253225 A1* | 11/2007 | Baurle | H02M 3/07 363/16 |
| 2008/0248335 A1* | 10/2008 | Kinoshita | H01M 10/488 429/7 |
| 2008/0284375 A1* | 11/2008 | Nagaoka | B60L 50/64 320/116 |
| 2009/0066291 A1* | 3/2009 | Tien | H02J 7/0016 320/118 |
| 2009/0179578 A1* | 7/2009 | Yang | H05B 45/42 315/250 |
| 2009/0179585 A1* | 7/2009 | Yang | H05B 45/37 315/291 |
| 2009/0179590 A1* | 7/2009 | Yang | H05B 45/37 315/297 |
| 2009/0179594 A1* | 7/2009 | Yang | H05B 45/37 315/307 |
| 2009/0224689 A1* | 9/2009 | Yang | H05B 45/3725 315/291 |
| 2009/0236911 A1* | 9/2009 | Carroll | H02J 7/35 320/101 |
| 2009/0314179 A1* | 12/2009 | Kumar | B61C 3/00 105/35 |
| 2010/0001682 A1* | 1/2010 | Dickson | H02J 7/0042 320/107 |
| 2010/0039072 A1* | 2/2010 | Cegnar | H01G 11/10 320/167 |
| 2010/0149840 A1* | 6/2010 | Hayasaki | B41J 2/435 363/21.09 |
| 2010/0261043 A1* | 10/2010 | Kim | H02J 7/0024 429/61 |
| 2011/0031816 A1* | 2/2011 | Buthker | H01L 31/02021 307/82 |
| 2011/0041723 A1* | 2/2011 | Kumar | B60L 15/2045 105/35 |
| 2011/0049977 A1* | 3/2011 | Onnerud | B60L 3/0046 307/9.1 |
| 2011/0080139 A1* | 4/2011 | Troxel | H01M 10/441 320/136 |
| 2011/0084663 A1* | 4/2011 | Troxel | H01M 10/425 320/118 |
| 2011/0089898 A1* | 4/2011 | Lee | H02J 7/345 320/116 |
| 2011/0095725 A1* | 4/2011 | Troxel | H01M 10/488 429/61 |
| 2011/0118916 A1* | 5/2011 | Gullichsen | B60L 58/19 701/22 |
| 2011/0156479 A1* | 6/2011 | Carroll | H02S 10/00 307/18 |
| 2011/0204722 A1* | 8/2011 | Kim | H02J 7/345 307/77 |
| 2011/0221398 A1* | 9/2011 | Ferber, Jr. | B60L 58/22 320/166 |
| 2011/0248681 A1* | 10/2011 | Miller | H02J 7/0018 320/126 |
| 2011/0285354 A1* | 11/2011 | Iwasa | H02J 7/0031 320/137 |
| 2011/0306295 A1* | 12/2011 | Butler | H02J 50/10 363/125 |
| 2012/0133310 A1* | 5/2012 | Lee | H02J 7/0024 320/117 |
| 2012/0153728 A1* | 6/2012 | Athas | H02M 3/07 307/80 |
| 2012/0256568 A1* | 10/2012 | Lee | B60L 7/26 429/150 |
| 2012/0274142 A1* | 11/2012 | Tinglow | H02J 7/0014 307/77 |
| 2012/0319493 A1* | 12/2012 | Kim | H01M 10/4207 307/80 |
| 2012/0319653 A1* | 12/2012 | Kumar | H02J 7/0013 320/118 |

(56) References Cited

U.S. PATENT DOCUMENTS

| | | | |
|---|---|---|---|
| 2013/0062946 A1* | 3/2013 | Ferber, Jr. | H02J 7/0016 307/43 |
| 2013/0154567 A1* | 6/2013 | Peterson | H02J 7/0063 320/126 |
| 2013/0260196 A1* | 10/2013 | Takahashi | H01M 50/204 429/90 |
| 2013/0300379 A1* | 11/2013 | Larsson | H02J 7/007182 320/166 |
| 2013/0307917 A1* | 11/2013 | Hayasaki | H02M 3/3385 363/21.16 |
| 2013/0329327 A1* | 12/2013 | Zara | H02H 3/207 361/86 |
| 2014/0012446 A1* | 1/2014 | Kumar | B60W 10/08 903/930 |
| 2014/0015321 A1* | 1/2014 | Nordin | H02J 9/061 307/43 |
| 2014/0015475 A1* | 1/2014 | Nakao | H01M 10/425 320/103 |
| 2014/0203654 A1* | 7/2014 | Takahashi | H01M 10/4207 307/43 |
| 2014/0232324 A1* | 8/2014 | Readio | H02J 7/0016 320/107 |
| 2015/0009657 A1* | 1/2015 | Bah | F21V 17/164 362/183 |
| 2015/0053741 A1* | 2/2015 | Shelton, IV | A61B 34/30 227/175.3 |
| 2015/0053746 A1* | 2/2015 | Shelton, IV | G06F 3/0488 227/177.1 |
| 2015/0053748 A1* | 2/2015 | Yates | G06T 11/60 227/180.1 |
| 2015/0054753 A1* | 2/2015 | Morgan | H02J 7/00 345/173 |
| 2015/0076209 A1* | 3/2015 | Shelton, IV | A61B 90/96 227/176.1 |
| 2015/0076210 A1* | 3/2015 | Shelton, IV | A61B 34/74 227/176.1 |
| 2015/0123618 A1* | 5/2015 | Athas | H02J 7/0019 320/128 |
| 2015/0263390 A1* | 9/2015 | Gagneur | H01M 50/574 429/61 |
| 2015/0349533 A1* | 12/2015 | Feuerstack | B60L 50/51 307/77 |
| 2016/0064969 A1* | 3/2016 | Pernyeszi | H02J 7/0014 320/118 |
| 2016/0079779 A1* | 3/2016 | Troxel | H01M 10/482 320/118 |
| 2016/0139208 A1* | 5/2016 | Tsuruta | G01R 31/371 324/426 |
| 2016/0149421 A1* | 5/2016 | White | H02J 7/0014 320/121 |
| 2016/0261127 A1* | 9/2016 | Worry | H02J 7/0029 |
| 2016/0273722 A1* | 9/2016 | Crenshaw | H02J 7/0047 |
| 2016/0285283 A1* | 9/2016 | Gagneur | H02J 7/0024 |
| 2016/0301215 A1* | 10/2016 | Murano | H01L 31/02021 |
| 2017/0007244 A1* | 1/2017 | Shelton, IV | A61B 17/00234 |
| 2017/0007245 A1* | 1/2017 | Shelton, IV | G06T 11/60 |
| 2017/0007246 A1* | 1/2017 | Shelton, IV | H01M 10/425 |
| 2017/0141586 A1* | 5/2017 | Pernyeszi | H01M 10/425 |
| 2017/0179462 A1* | 6/2017 | Bourns | H02H 7/18 |
| 2017/0179713 A1* | 6/2017 | Bourns | H02H 9/026 |
| 2017/0207637 A1* | 7/2017 | Sugeno | H02J 7/0013 |
| 2017/0230074 A1* | 8/2017 | Rose | H02J 7/0014 |
| 2017/0230907 A1* | 8/2017 | Rose | G01D 4/004 |
| 2018/0009317 A1* | 1/2018 | Chung | H01M 50/569 |
| 2018/0055513 A1* | 3/2018 | Shelton, IV | G16H 20/40 |
| 2018/0064440 A1* | 3/2018 | Shelton, IV | A61B 34/74 |
| 2018/0064441 A1* | 3/2018 | Shelton, IV | H02J 7/342 |
| 2018/0064442 A1* | 3/2018 | Shelton, IV | H02J 7/0068 |
| 2018/0064443 A1* | 3/2018 | Shelton, IV | A61B 17/07207 |
| 2018/0146960 A1* | 5/2018 | Shelton, IV | G06F 21/60 |
| 2018/0153542 A1* | 6/2018 | Shelton, IV | A61B 90/90 |
| 2018/0206843 A1* | 7/2018 | Yates | H01M 10/425 |
| 2018/0224506 A1* | 8/2018 | Kurosaki | H02J 7/02 |
| 2018/0226823 A1* | 8/2018 | Ashcraft | B60L 58/12 |
| 2018/0287657 A1* | 10/2018 | Rose | H04B 1/0475 |
| 2018/0294833 A1* | 10/2018 | Rose | H03F 3/24 |
| 2018/0301899 A1* | 10/2018 | Nordin | H02J 9/061 |
| 2018/0368833 A1* | 12/2018 | Shelton, IV | A61B 90/03 |
| 2019/0063891 A1* | 2/2019 | Rastegar | H02N 2/181 |
| 2019/0110791 A1* | 4/2019 | Shelton, IV | G16Z 99/00 |
| 2019/0110792 A1* | 4/2019 | Shelton, IV | A61B 17/105 |
| 2019/0114619 A1* | 4/2019 | Wilson | G06Q 20/3278 |
| 2019/0202385 A1* | 7/2019 | Lo | H01M 4/583 |
| 2019/0207394 A1* | 7/2019 | Troxel | H01M 10/441 |
| 2019/0288610 A1* | 9/2019 | Chen | H02M 7/537 |
| 2019/0348843 A1* | 11/2019 | Sato | H02J 7/0019 |
| 2020/0033392 A1* | 1/2020 | Tzivanopoulos | G01R 31/50 |
| 2020/0107829 A1* | 4/2020 | Shelton, IV | A61B 34/76 |
| 2020/0138436 A1* | 5/2020 | Yates | G16H 40/63 |
| 2020/0228156 A1* | 7/2020 | Rose | H04B 1/40 |
| 2020/0244075 A1* | 7/2020 | Park | H02J 7/0048 |
| 2020/0303934 A1* | 9/2020 | White | H02J 7/0019 |
| 2020/0334663 A1* | 10/2020 | Wilson | G01R 31/3648 |
| 2020/0337702 A1* | 10/2020 | Shelton, IV | A61B 17/07207 |
| 2021/0302015 A1* | 9/2021 | Moufawad | F21V 33/0032 |
| 2021/0391888 A1* | 12/2021 | Rose | H04B 1/44 |
| 2022/0115878 A1* | 4/2022 | Khozikov | B60L 58/18 |
| 2022/0205420 A1* | 6/2022 | Kumar | F02N 7/08 |
| 2022/0209546 A1* | 6/2022 | Hall | B60L 53/60 |
| 2023/0059046 A1* | 2/2023 | Khozikov | H02J 7/00304 |

FOREIGN PATENT DOCUMENTS

| | | | | |
|---|---|---|---|---|
| FR | 2926927 A1 | * | 7/2009 | B60L 11/005 |
| JP | H0799723 A | * | 4/1995 | |
| JP | 3419122 B2 | * | 6/2003 | |
| WO | WO-2017153317 A1 | * | 9/2017 | H01M 10/425 |

* cited by examiner

CHARGE BALANCING OF PARALLEL STRINGS WITH ZENER DIODE AND LIGHT EMITTING DIODE BETWEEN CELL TERMINAL OF THE BATTERY STRINGS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity including circuit arrangements for charging or depolarizing batteries, more specifically, a circuit for equalizing the charge between a plurality of batteries. (H02J7/0014)

SUMMARY OF INVENTION

The battery-charging system is an electric circuit. The battery-charging system is an electrochemical device. The battery-charging system converts chemical potential energy into electrical energy used to power an electric load. The battery-charging system is an electric circuit. The battery-charging system comprises a power distribution circuit and a regeneration circuit. The power distribution circuit generates a plurality of specified voltage values that are capable of meeting a plurality of input voltage specifications. The power distribution is capable of simultaneously supplying electric energy to a plurality of electric loads. The power distribution circuit further comprises an electric circuit that redistributes the chemical potential energy stored within the power distribution circuit to match the electrical energy needs of the plurality of electric loads.

The power distribution circuit electrically connects to the regeneration circuit. The power distribution circuit electrically disconnects from the regeneration circuit. The power distribution circuit is independently powered. By independently powered is meant that the power distribution circuit can distribute electrical to the electric load while disconnected from the regeneration circuit. The power distribution circuit is rechargeable. By rechargeable circuit is meant that the regeneration circuit is an electric circuit that reverses the polarity of the power distribution circuit and provides the energy necessary to reverse the chemical processes that the power distribution circuit initially used to generate the electrical energy. This reversal of the chemical process creates a chemical potential energy that will later be used by the power distribution circuit to generate electricity.

These together with additional objects, features and advantages of the battery-charging system will be readily apparent to those of ordinary skill in the art upon reading the following detailed description of the presently preferred, but nonetheless illustrative, embodiments when taken in conjunction with the accompanying drawings.

In this respect, before explaining the current embodiments of the battery-charging system in detail, it is to be understood that the battery-charging system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the battery-charging system.

It is therefore important that the claims be regarded as including such equivalent construction insofar as they do not depart from the spirit and scope of the battery-charging system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
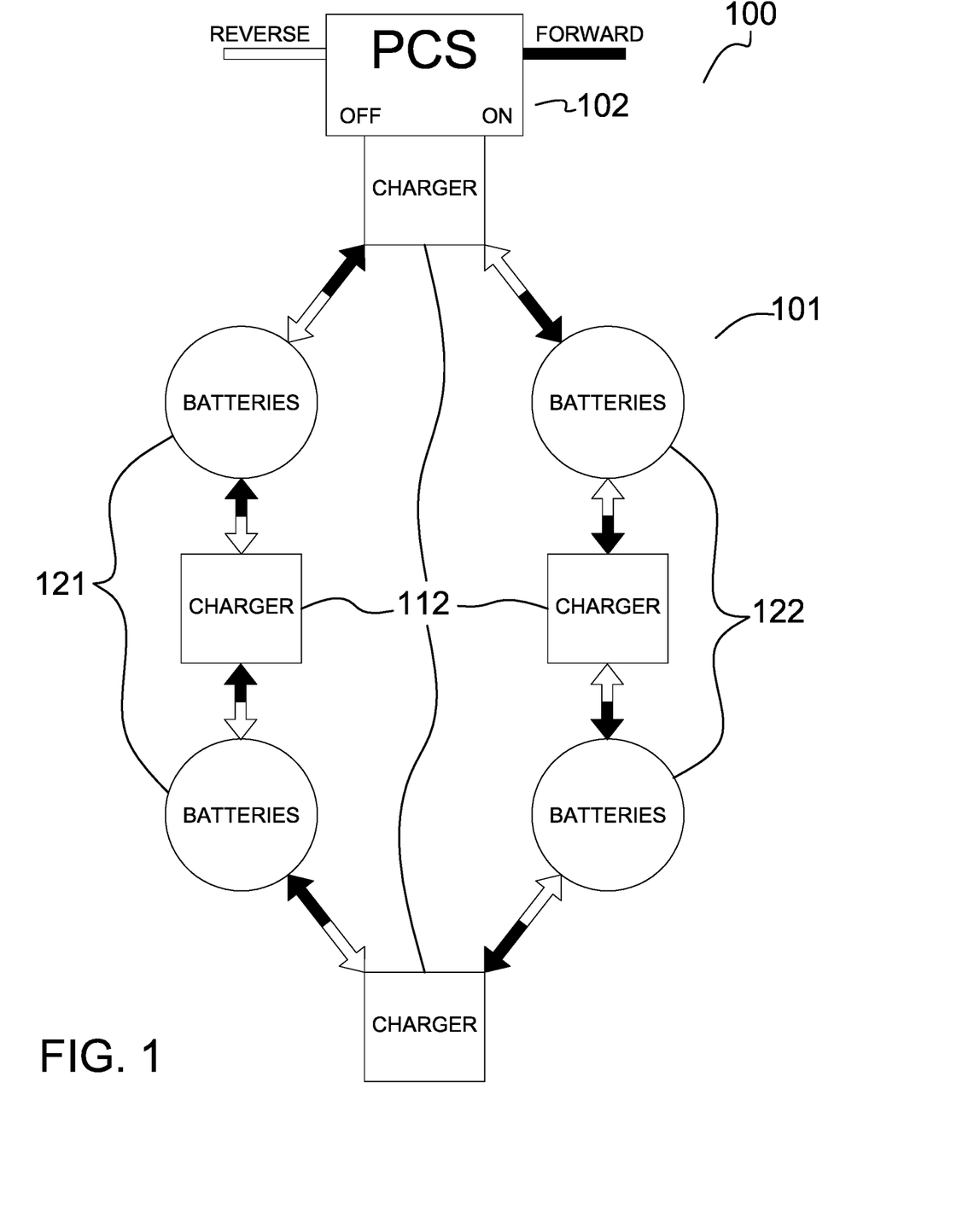
FIG. 1 is a block diagram of an embodiment of the disclosure.
Figure 2:
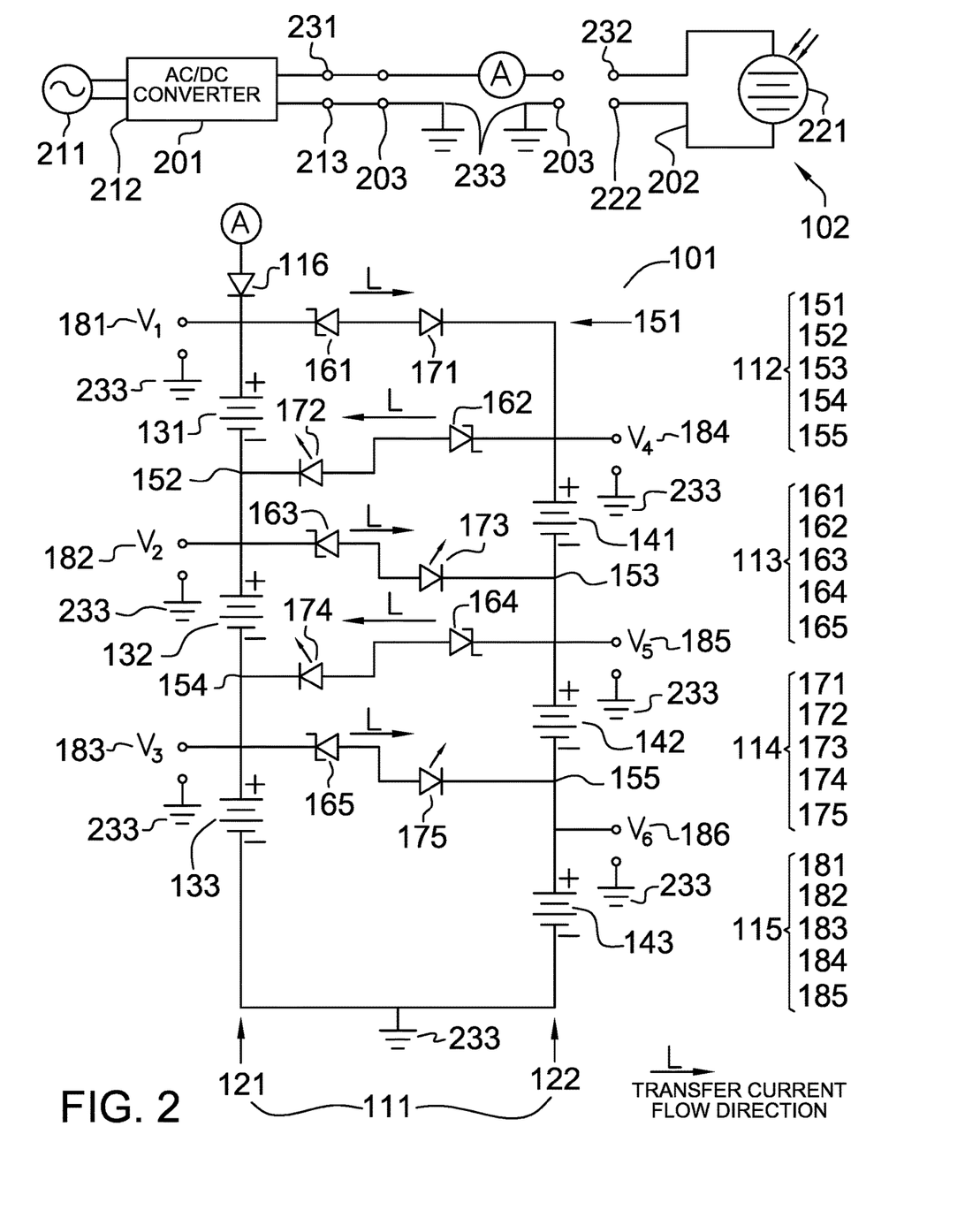
FIG. 2 is a schematic view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. Detailed reference will now be made to one or more potential embodiments of the disclosure, which are illustrated in FIGS. 1 through 2.

The battery-charging system 100 (hereinafter invention) is an electric circuit. The invention 100 is an electrochemical device. The invention 100 converts chemical potential energy into electrical energy used to power an electric load. The invention 100 is an electric circuit. The invention 100 comprises a power distribution circuit 101 and a regeneration circuit 102. The power distribution circuit 101 generates a plurality of specified voltage values that are capable of meeting a plurality of input voltage specifications. The power distribution is capable of simultaneously supplying electric energy to a plurality of electric loads. The power distribution circuit 101 further comprises an electric circuit that redistributes the chemical potential energy stored within the power distribution circuit 101 to match the electrical energy needs of the plurality of electric loads.

The power distribution circuit 101 electrically connects to the regeneration circuit 102. The power distribution circuit 101 electrically disconnects from the regeneration circuit 102. The power distribution circuit 101 is independently powered. By independently powered is meant that the power distribution circuit 101 can distribute electrical to the electric load while disconnected from the regeneration circuit 102. The power distribution circuit 101 is rechargeable. By rechargeable circuit is meant that the regeneration circuit 102 is an electric circuit that reverses the polarity of the power distribution circuit 101 and provides the energy necessary to reverse the chemical processes that the power distribution circuit 101 initially used to generate the electrical energy. This reversal of the chemical process creates a chemical potential energy that will later be used by the power distribution circuit 101 to generate electricity.

The power distribution circuit 101 is an electric circuit. The power distribution circuit 101 is an electrochemical device. The power distribution circuit 101 stores chemical potential energy in a plurality of batteries 111. The power distribution circuit 101 converts the stored chemical potential energy into electrical energy. The power distribution circuit 101 distributes the converted electrical energy to one or more electric loads. The electric load is defined elsewhere in this disclosure.

The power distribution circuit 101 distributes the converted electrical energy to the one or more electric loads through a plurality of voltage terminals 115. Each voltage terminal selected from the plurality of voltage terminals 115 distributes the electrical energy at a specified voltage value that is different from the specified voltage values of the voltage terminals remaining in the plurality of voltage terminals 115.

The power distribution circuit 101 redistributes the chemical potential energy stored within the power distribution circuit 101 from the one or more voltage terminals selected from the plurality of voltage terminals 115 with the lowest demand for electrical energy to the one or more voltage terminals selected from the plurality of voltage terminals 115 with the greatest demand for electrical energy. The power distribution circuit 101 redistributes the chemical potential energy between the plurality of batteries 111.

The power distribution circuit 101 comprises a plurality of batteries 111, a plurality of transfer connections 112, a plurality of voltage terminals 115, a feed diode 116, a plurality of Zener diodes 113, and a plurality of LEDs 114. The plurality of batteries 111, the plurality of transfer connections 112, the plurality of voltage terminals 115, and the feed diode 116 are electrically connected. The plurality of transfer connections 112 further comprises components drawn from the plurality of Zener diodes 113 and the plurality of LEDs 114.

Each of the plurality of batteries 111 is an electrochemical device. Each of the plurality of batteries 111 stores chemical potential energy. Each of the plurality of batteries 111 converts the stored chemical potential energy into electrical energy of a specified voltage value. Each of the plurality of batteries 111 is a rechargeable battery. Each battery selected from the plurality of batteries 111 further comprises a positive terminal and a negative terminal. The positive terminal of each battery selected from the plurality of batteries 111 electrically connects to a voltage terminal selected from the plurality of voltage terminals 115. The plurality of batteries 111 comprises a plurality of higher voltage batteries 121 and a plurality of lower voltage batteries 122.

Each of the plurality of lower voltage batteries 122 is a rechargeable battery. The plurality of lower voltage batteries 122 stores chemical potential energy and converts the stored chemical potential energy into electrical energy. Each of the plurality of lower voltage batteries 122 is identical. Each of the plurality of lower voltage batteries 122 is defined with a specified voltage value. The specified voltage value of each of the plurality of lower voltage batteries 122 is also identical. The plurality of lower voltage batteries 122 are electrically interconnected to form a series circuit.

Each of the plurality of higher voltage batteries 121 is a rechargeable battery. The plurality of higher voltage batteries 121 stores chemical potential energy and converts the stored chemical potential energy into electrical energy. Each of the plurality of higher voltage batteries 121 is identical. Each of the plurality of higher voltage batteries 121 is defined with a specified voltage value. The specified voltage value of each of the plurality of higher voltage batteries 121 is also identical.

The specified voltage value of each of the plurality of higher voltage batteries 121 is greater than 1.6 times the specified voltage value of any lower voltage battery selected from the plurality of lower voltage batteries 122. The specified voltage value of each of the plurality of higher voltage batteries 121 is lesser than 2.0 times the specified voltage value of any lower voltage battery selected from the plurality of lower voltage batteries 122. The plurality of higher voltage batteries 121 are electrically interconnected to form a series circuit. The plurality of higher voltage batteries 121 are electrically connected in a parallel circuit with the plurality of lower voltage batteries 122. The plurality of higher voltage batteries 121 and the plurality of lower voltage batteries 122 are electrically interconnected using the plurality of transfer connections 112.

Each of the plurality of transfer connections 112 is an electric sub-circuit formed within the power distribution circuit 101. Each transfer connection selected from the plurality of transfer connections 112 redistributes chemical potential energy within the power distribution circuit 101 by: a) transferring electrical energy from a supplying battery selected from the plurality of higher voltage batteries 121 to a receiving battery selected from the plurality of lower voltage batteries 122; or, b) transferring electrical energy from a supplying battery selected from the plurality of lower voltage batteries 122 to a receiving battery selected from the plurality of higher voltage batteries 121. Each transfer connection selected from the plurality of transfer connections 112 electrically connects the positive terminal of the supplying battery to the positive terminal of the receiving battery. The plurality of transfer connections 112 are arranged such that direction of exchange of chemical potential energy is always between (in either direction) the plurality of higher voltage batteries 121 and the plurality of lower voltage batteries 122.

Each transfer connection selected from the plurality of transfer connections 112 comprises a Zener diode selected from the plurality of Zener diodes 113 and an LED selected from the plurality of LEDs 114. The anode of the Zener diode of each selected transfer connection electrically connects to the anode of the LED of the selected transfer connection. The cathode of the Zener diode of each selected transfer connection electrically connects to the voltage terminal selected from the plurality of voltage terminals 115 that electrically connects to the positive terminal of the supplying battery. The cathode of the LED of each selected transfer connection electrically connects to the voltage terminal selected from the plurality of voltage terminals 115 that electrically connects to the positive terminal of the receiving battery. This relationship between the plurality of voltage terminals 115 and the plurality of batteries 111 are described elsewhere in this disclosure.

Each transfer connection selected from the plurality of transfer connections 112 limits the electric current flow through the selected transfer connection from the voltage terminal selected from the plurality of voltage terminals 115 that electrically connects to the positive terminal of the supplying battery to the voltage terminal selected from the plurality of voltage terminals 115 that electrically connects to the positive terminal of the receiving battery.

The following two paragraphs describe the theory of operation of the plurality of transfer connections 112.

The LED of each transfer connection selected from the plurality of transfer connections 112 installs in series between the receiving battery and the supplying battery. The LED of each transfer connection prevents the flow of electricity from the positive terminal of the receiving battery into the positive terminal of the supplying battery. The purpose of the LED is to prevent uncontrolled electric current flows in the event that the supplying battery should fail during the use of the invention 100. The diode and the LED are defined elsewhere in this disclosure.

The Zener diode of each transfer connection plurality of Zener diodes 113 installs in series between the receiving battery and the supplying battery. The Zener diode of each transfer connection is a voltage sensitive device. The Zener diode allows the flow of electricity from the positive terminal of the supplying battery to the positive terminal of the receiving battery when the voltage across the Zener diode from the cathode to the anode exceeds the threshold voltage of the Zener diode. When the receiving battery falls below the specified voltage value of the receiving battery by an amount greater than the threshold voltage of the Zener diode plus the forward bias voltage of the LED, the Zener diode allows electric current to flow from the supplying battery into the receiving battery such that the polarity of the receiving battery is reversed thereby recharging the receiving battery. The threshold voltage is described elsewhere in this disclosure.

Each of the plurality of Zener diodes 113 is a two-terminal electrical device. Each of the plurality of Zener diodes 113 allows for the free flow of electricity in a first direction from the anode of the Zener diode to the cathode of the Zener diode. Each of the plurality of Zener diodes 113 is further defined with a threshold voltage. The plurality of Zener diodes 113 prevents the flow of electricity in a second direction from the cathode to the anode as long as the voltage across the Zener diode from the cathode to the anode is lesser than the threshold voltage of the Zener diode. The plurality of Zener diodes 113 allows for the free flow of electricity in the second direction when the voltage across the Zener diode is greater than the threshold voltage. The Zener diode is defined elsewhere in this disclosure.

Each of the plurality of LEDs 114 is a diode. Each LED selected from the plurality of LEDs 114 allows electric current to flow in a first direction from the anode of the selected LED to the cathode of the LED. Each LED selected from the plurality of LEDs 114 prevents electric current flow in a second direction from the cathode of the selected LED to the anode of the LED. Each LED selected from the plurality of LEDs 114 generates an illumination when an electric current is flowing through the selected diode in the first direction.

Each of the plurality of voltage terminals 115 is an electric terminal. Each electric terminal selected from the plurality of voltage terminals 115 electrically connects to the positive terminal of a battery selected from the plurality of batteries 111. Each electric terminal selected from the plurality of voltage terminals 115 forms an electrical connection that presents to the one or more electric loads a voltage potential between the positive terminal of the selected battery and the electrical ground 233 of the regeneration circuit 102 that can be used to provide electrical energy to the one or more electric loads. Each electric terminal selected from the plurality of voltage terminals 115 electrically connects to a transfer connection selected from the plurality of transfer connections 112 such that chemical potential energy can be exchanged between the battery electrically connected to the selected voltage terminal and the other batteries contained in the plurality of batteries 111.

The feed diode 116 is a diode that limits the flow of electricity to the direction from the anode of the feed diode 116 towards the cathode of the feed diode 116. The feed diode is placed in series between the power distribution circuit 101 and the regeneration circuit 102 such that electricity will not flow from the power distribution circuit 101 into the regeneration circuit 102. The diode is defined elsewhere in this disclosure.

The plurality of higher voltage batteries 121 comprises a first higher voltage battery 131, a second higher voltage battery 132, and a third higher voltage battery 133. The first higher voltage battery 131 is a battery selected from the plurality of higher voltage batteries 121. The positive terminal of the first higher voltage battery 131 electrically connects to the anode of the feed diode 116. The second higher voltage battery 132 is a battery selected from the plurality of higher voltage batteries 121. The positive terminal of the second higher voltage battery 132 electrically connects to the negative terminal of the first higher voltage battery 131. The third higher voltage battery 133 is a battery selected from the plurality of higher voltage batteries 121. The positive terminal of the third higher voltage battery 133 electrically connects to the negative terminal of the second higher voltage battery 132. The negative terminal of the third higher voltage battery 133 electrically connects to the electrical ground 233 of the regeneration circuit 102.

The plurality of lower voltage batteries 122 comprises a first lower voltage battery 141, a second lower voltage battery 142, and a third lower voltage battery 143. The first lower voltage battery 141 is a battery selected from the plurality of higher voltage batteries 121. The positive terminal of the first lower voltage battery 141 electrically connects to the first transfer connection 151. The second lower voltage battery 142 is a battery selected from the plurality of higher voltage batteries 121. The positive terminal of the second lower voltage battery 142 electrically connects to the negative terminal of the first lower voltage battery 141. The third lower voltage battery 143 is a battery selected from the plurality of higher voltage batteries 121. The positive terminal of the third lower voltage battery 143 electrically connects to the negative terminal of the second lower voltage battery 142. The negative terminal of the third lower voltage battery 143 electrically connects to the electrical ground 233 of the regeneration circuit 102.

The plurality of transfer connections 112 comprises a first transfer connection 151, a second transfer connection 152, a third transfer connection 153, a fourth transfer connection 154, and a fifth transfer connection 155. The plurality of Zener diodes 113 comprises a first Zener diode 161, a second Zener diode 162, a third Zener diode 163, a fourth Zener diode 164, and a fifth Zener diode 165. The plurality of LEDs 114 comprises a first LED 171, a second LED 172, a third LED 173, a fourth LED 174, and a fifth LED 175.

The first transfer connection 151 is the transfer connection that transfers electric current from the positive terminal of the first higher voltage battery 131 into the positive terminal of the first lower voltage battery 141. The first transfer connection 151 comprises the first Zener diode 161 and the first LED 171. The cathode of the first Zener diode 161 electrically connects the first transfer connection 151 to the positive terminal of the first higher voltage battery 131. The cathode of the first LED 171 electrically connects the first transfer connection 151 to the positive terminal of the first lower voltage battery 141. The anode of the first Zener diode 161 electrically connects to the anode of the first LED 171.

The second transfer connection 152 is the transfer connection that transfers electric current from the positive terminal of the first lower voltage battery 141 into the positive terminal of the second higher voltage battery 132. The second transfer connection 152 comprises the second Zener diode and the second LED 172. The cathode of the second Zener diode 162 electrically connects the second transfer connection 152 to the positive terminal of the first lower voltage battery 141. The cathode of the second LED 172 electrically connects the second transfer connection 152 to the positive terminal of the second higher voltage battery 132. The anode of the second Zener diode 162 electrically connects to the anode of the second LED 172.

The third transfer connection 153 is the transfer connection that transfers electric current from the positive terminal of the second higher voltage battery 132 into the positive terminal of the second lower voltage battery 142. The third transfer connection 153 comprises the third Zener diode 163 and the third LED 173. The cathode of the third Zener diode 163 electrically connects the third transfer connection 153 to the positive terminal of the second higher voltage battery 132. The cathode of the third LED 173 electrically connects the third transfer connection 153 to the positive terminal of the second lower voltage battery 142. The anode of the third Zener diode electrically connects to the anode of the third LED 173.

The fourth transfer connection 154 is the transfer connection that transfers electric current from the positive terminal of the second lower voltage battery 142 into the positive terminal of the third higher voltage battery 133. The fourth transfer connection 154 comprises the fourth Zener diode 164 and the fourth LED 174. The cathode of the fourth Zener diode 164 electrically connects the fourth transfer connection 154 to the positive terminal of the second lower voltage battery 142. The cathode of the fourth LED 174 electrically connects the fourth transfer connection 154 to the positive terminal of the third higher voltage battery 133. The anode of the fourth Zener diode 164 electrically connects to the anode of the fourth LED 174.

The fifth transfer connection 155 is the transfer connection that transfers electric current from the positive terminal of the third higher voltage battery 133 into the positive terminal of the third lower voltage battery 143. The fifth transfer connection 155 comprises the fifth Zener diode 165 and the fifth LED 175. The cathode of the fifth Zener diode 165 electrically connects the fifth transfer connection 155 to the positive terminal of the third higher voltage battery 133. The cathode of the fifth LED 175 electrically connects the fifth transfer connection 155 to the positive terminal of the third lower voltage battery 143. The anode of the fifth Zener diode 165 electrically connects to the anode of the fifth LED 175.

The plurality of voltage terminals 115 comprises a first voltage terminal 181, a second voltage terminal 182, a third voltage terminal 183, a fourth voltage terminal 184, a fifth voltage terminal 185, and a sixth voltage terminal 186.

The first voltage terminal 181 electrically connects to the positive terminal of the first higher voltage battery 131. The first voltage terminal 181 presents the electric potential between the first voltage terminal 181 and the electrical ground of the regeneration circuit 102 to the one or more electric loads that is nominally three times the specified voltage value of the third higher voltage battery 133. The second voltage terminal 182 electrically connects to the positive terminal of the second higher voltage battery 132.

The second voltage terminal 182 presents the electric potential between the second voltage terminal 182 and the electrical ground 233 of the regeneration circuit 102 to the one or more electric loads that is nominally two times the specified voltage value of the third higher voltage battery 133. The third voltage terminal 183 electrically connects to the positive terminal of the second higher voltage battery 132. The third voltage terminal 183 presents the electric potential between the third voltage terminal 183 and the electrical ground of the regeneration circuit 102 to the one or more electric loads that is nominally equal to the specified voltage value of the third higher voltage battery 133.

The fourth voltage terminal 184 electrically connects to the positive terminal of the first lower voltage battery 141. The fourth voltage terminal 184 presents the electric potential between the fourth voltage terminal 184 and the electrical ground 233 of the regeneration circuit 102 to the one or more electric loads that is nominally three times the specified voltage value of the third lower voltage battery 143.

The fifth voltage terminal 185 electrically connects to the positive terminal of the second lower voltage battery 142. The fifth voltage terminal 185 presents the electric potential between the fifth voltage terminal 185 and the electrical ground 233 of the regeneration circuit 102 to the one or more electric loads that is nominally two times the specified voltage value of the third lower voltage battery 143.

The sixth voltage terminal 186 electrically connects to the positive terminal of the second lower voltage battery 142. The sixth voltage terminal 186 presents the electric potential between the sixth voltage terminal 186 and the electrical ground 233 of the regeneration circuit 102 to the one or more electric loads that is nominally equal to the specified voltage value of the third lower voltage battery 143.

The regeneration circuit 102 is an electric circuit. The regeneration circuit 102 is an external power source that electrically connects to the plurality of batteries 111 in the power distribution circuit 101. The chemical energy stored within the plurality of batteries 111 in the power distribution circuit 101 is renewed and restored through the use of the regeneration circuit 102. The regeneration circuit 102 is an electrical circuit that reverses the polarity of each of the plurality of batteries 111 and provides the energy necessary to reverse the chemical processes that the plurality of batteries initially used to generate the electrical energy. The regeneration circuit 102 comprises a primary power source 201, an alternate power source 202, and a transfer port 203. The primary power source 201 electrically connects to the transfer port 203. The alternate power source 202 electrically connects to the transfer port 203.

The transfer port 203 is an electric port. The transfer port 203 allows for a removable electrical connection to be made between primary power source 201 and the power distribution circuit 101. The transfer port 203 allows for a removable electrical connection to be made between alternate power source 202 and the power distribution circuit 101.

The primary power source 201 is a commercially available source of electric power. The primary power source 201 is used to resupply the regeneration circuit 102 with the electrical energy necessary to restore the chemical potential energy contained in each of the plurality of batteries 111. The primary power source 201 further comprises a national electric grid 211, an ac/dc converter 212, and a first transfer plug 213. The ac/dc converter 212 further comprises a first positive terminal 231 and an electrical ground 233.

The national electric grid 211 is a commercially available source of ac electric power. The national electric grid 211 is defined elsewhere in this disclosure. The ac/dc converter 212 is an electric circuit that converts ac electric power into dc electric power. The ac/dc converter 212 is defined elsewhere in this disclosure. The first transfer plug 213 is an electric plug. The first transfer plug 213 inserts into the transfer port 203 to electrically connect the ac/dc converter 212 to the power distribution circuit 101. The transfer port 203 electrically connects the first positive terminal 231 of the ac/dc converter 212 to the anode of the feed diode 116.

The alternate power source 202 is an alternative electric power source. The alternative electric power source is defined elsewhere in this disclosure. The alternate power source 202 is used to resupply the regeneration circuit 102 with the electrical energy necessary to restore the chemical potential energy contained in each of the plurality of batteries 111. The alternate power source 202 further comprises a photovoltaic cell 221 and a second transfer plug 222. The photovoltaic cell 221 further comprises a second positive terminal 232 and an electrical ground 233. The electrical ground 233 of the ac/dc converter 212 and the electrical ground 233 of the photovoltaic cell 221 share the same electric potential.

The photovoltaic cell 221 is a photoelectric device. The photovoltaic cell 221 converts light directly into electric energy. The photovoltaic cell 221 is defined elsewhere in this disclosure. The second transfer plug 222 is an electric plug. The second transfer plug 222 inserts into the transfer port 203 to electrically connect the photovoltaic cell 221 to the power distribution circuit 101. The transfer port 203 further connects the second positive terminal 232 of the photovoltaic cell 221 to the anode of the feed diode 116.

The electrical ground 233 forms a reference voltage for the invention 100. The electrical ground 233 is defined elsewhere in this disclosure.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal and a power input.

Alternative Electric Power Source: In this disclosure, an alternative electric power source is an external electric power source that uses wind or solar power as its energy source.

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: a) the positive terminal of a power consuming electrical circuit element; b) the negative terminal of a discharging battery or an electrical power source; and, c) the positive terminal of a charging battery. As a further practical matter the cathode refers to: a) the negative terminal of a power consuming electrical circuit element; b) the positive terminal of a discharging battery or an electrical power source; and, c) the negative terminal of a charging battery.

Battery: As used in this disclosure, a battery is a chemical device consisting of one or more cells, in which chemical energy is converted into electricity and used as a source of power. Batteries are commonly defined with a positive terminal and a negative terminal.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Electric Circuit: As used in this disclosure, an electric circuit is a closed loop path through which electrons flow. The closed loop will generally initiate and terminate at an electrical power source.

Electric Current: As used in this disclosure, an electric current refers to the net movement of electrons past a point in an electric circuit: Electric current is often referred to as a current. Electric current is measured in Amperes (Amps) and has the units of coulombs per second.

Electrical Ground: As used in this disclosure, an electrical ground is a common reference voltage that is used in the design and implementation of electrical circuits. An electrical ground is often, but not necessarily, the discharge point of electric currents flowing through an electric circuit.

External Power Source: As used in this disclosure, an external power source is a source of the energy that is externally provided to enable the operation of the present disclosure. Examples of external power sources include, but are not limited to, electrical power sources and compressed air sources.

LED: As used in this disclosure, an LED is an acronym for a light emitting diode. A light emitting diode is a diode that is also a light source.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid sells electrical power for use by an electrical load. The national electric grid invoices for electrical power based on the total energy consumed by the electrical load. The national electric grid measures the energy consumption of an electrical load with an electrical meter.

Nominal: As used in this disclosure, the term nominal refers to a designed or intended value of the measure of a physical parameter of an object. The use of the term nominal implies that the exact value of the physical parameter of an instantiation of the object will roughly equal the nominal value.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Parallel Circuit: As used in this disclosure, a parallel circuit refers to a method of electrically connecting a plurality of circuit elements to a voltage source. In a parallel circuit each circuit element receives a voltage equal to the full voltage produced by the voltage source.

Plug: As used in this disclosure, a plug is an electrical termination that electrically connects a first electrical circuit to a second electrical circuit or a source of electricity. As used in this disclosure, a plug will have two or three metal pins.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Port: As used in this disclosure, a port is an electrical termination that is used to connect a first electrical circuit to a second external electrical circuit. In this disclosure, the port is designed to receive a plug.

Roughly: As used in this disclosure, roughly refers to a comparison between two objects. Roughly means that the difference between one or more parameters of the two compared objects are not significantly different.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Volt: As used in this disclosure, a volt refers to the difference in electrical potential energy between two points in an electric circuit. A volt is measured as joules per coulomb. The term voltage refers to a quantitative measure of the volts between the two points.

Zener Diode: As used in this disclosure, a Zener diode is a two terminal electrical device that is used to generate a known voltage that is relatively independent of variations in the voltage applied to the Zener diode. The known voltage is referred to as the Zener voltage.

With respect to the above description, it is to be realized that the optimum dimensional relationship for the various components of the invention described above and in FIGS. 1 through 2 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An electric power system comprising:
a power distribution circuit and a regeneration circuit;
wherein the power distribution circuit electrically connects to the regeneration circuit;
wherein the power distribution circuit electrically disconnects from the regeneration circuit; wherein the power distribution circuit is independently powered;
wherein by independently powered is meant that the power distribution circuit can distribute electricity to an electric load while disconnected from the regeneration circuit;
wherein the electric power system is an electric circuit;
wherein the electric power system is an electrochemical device;
wherein the electric power system redistributes a stored chemical potential energy to match the electrical needs of the electric load;
wherein the power distribution circuit comprises a plurality of batteries, a plurality of transfer connections, a plurality of voltage terminals, a feed diode, a plurality of Zener diodes, and a plurality of LEDs (light emitting diodes);
wherein the plurality of batteries, the plurality of transfer connections, the plurality of voltage terminals, and the feed diode are electrically connected;
wherein each transfer connection selected from the plurality of transfer connections comprises a Zener diode selected from the plurality of Zener diodes and an LED selected from the plurality of LEDs;
wherein an anode of the Zener diode of each selected transfer connection electrically connects to an anode of the LED of the selected transfer connection;
wherein a cathode of the Zener diode of each of the selected transfer connection electrically connects to the voltage terminal selected from the plurality of voltage terminals that electrically connects to a positive terminal of a supplying battery;
wherein each of the plurality of Zener diodes is further defined with a threshold voltage;
wherein a cathode of the LED of each of the selected transfer connection electrically connects to the voltage terminal selected from the plurality of voltage terminals that electrically connects to a positive terminal of a receiving battery;
wherein each transfer connection selected from the plurality of transfer connections limits the electric current flow through the selected transfer connection from the voltage terminal selected from the plurality of voltage terminals that electrically connects to the positive terminal of the supplying battery to the voltage terminal selected from the plurality of voltage terminals that electrically connects to the positive terminal of the receiving battery;

wherein each of the plurality of transfer connections is an electric sub-circuit formed within the power distribution circuit;

wherein the plurality of batteries comprises a plurality of higher voltage batteries and a plurality of lower voltage batteries;

wherein each transfer connection selected from the plurality of transfer connections redistributes chemical potential energy within the power distribution circuit by:
- a) transferring electrical energy from a supplying battery selected from the plurality of higher voltage batteries to a receiving battery selected from the plurality of lower voltage batteries; or,
- b) transferring electrical energy from a supplying battery selected from the plurality of lower voltage batteries to a receiving battery selected from the plurality of higher voltage batteries;

wherein each transfer connection selected from the plurality of transfer connections electrically connects the positive terminal of the supplying battery to the positive terminal of the receiving battery;

wherein the LED of each transfer connection selected from the plurality of transfer connections installs in series between the receiving battery and the supplying battery;

wherein the LED of each transfer connection prevents the flow of electricity from the positive terminal of the receiving battery into the positive terminal of the supplying battery;

wherein the Zener diode of each transfer connection plurality of Zener diodes installs in series between the receiving battery and the supplying battery;

wherein the Zener diode allows the flow of electricity from the positive terminal of the supplying battery to the positive terminal of the receiving battery when the voltage across the Zener diode from the cathode to the anode exceeds the threshold voltage of the Zener diode;

wherein each of the plurality of lower voltage batteries is identical;

wherein the plurality of lower voltage batteries are electrically interconnected to form a series circuit; wherein each of the plurality of higher voltage batteries is identical;

wherein the higher specified voltage value of each of the plurality of higher voltage batteries is identical;

wherein the plurality of higher voltage batteries are electrically interconnected to form a series circuit;

wherein the plurality of higher voltage batteries are electrically connected in a parallel circuit with the plurality of lower voltage batteries;

wherein the plurality of higher voltage batteries and the plurality of lower voltage batteries are electrically interconnected using the plurality of transfer connections.

2. The electric power system according to claim 1,
wherein the regeneration circuit is an electric circuit;
wherein the regeneration circuit is an external power source that electrically connects to the plurality of batteries in the power distribution circuit;
wherein the regeneration circuit is an electrical circuit that provides the energy necessary to reverse the chemical processes that the plurality of batteries initially used to generate the electrical energy.

3. The electric power system according to claim 2,
wherein the power distribution circuit generates a plurality of specified voltage values that are capable of meeting a plurality of input voltage specifications;
wherein the power distribution circuit is capable of simultaneously supplying electric energy to the electric load.

4. The electric power system according to claim 3,
wherein the power distribution circuit redistributes the chemical potential energy between the plurality of batteries;
wherein the power distribution circuit distributes the converted electrical energy to the one or more electric loads through the plurality of voltage terminals;
wherein each voltage terminal selected from the plurality of voltage terminals distributes the electrical energy at a specified voltage value that is different from the specified voltage values of the voltage terminals remaining in the plurality of voltage terminals;
wherein the power distribution circuit redistributes the chemical potential energy stored within the power distribution circuit from the one or more voltage terminals selected from the plurality of voltage terminals with the lowest demand for electrical energy to the one or more voltage terminals selected from the plurality of voltage terminals with the greatest demand for electrical energy.

5. The electric power system according to claim 4,
wherein the plurality of lower voltage batteries stores chemical potential energy and converts the stored chemical potential energy into electrical energy;
wherein each of the plurality of lower voltage batteries is defined with a lower specified voltage value;
wherein the lower specified voltage value of each of the plurality of lower voltage batteries is identical;
wherein the plurality of higher voltage batteries stores chemical potential energy and converts the stored chemical potential energy into electrical energy;
wherein each of the plurality of higher voltage batteries is defined with a higher specified voltage value;
wherein the higher specified voltage value of each of the plurality of higher voltage batteries is greater than 1.6 times the lower specified voltage value of any lower voltage battery selected from the plurality of lower voltage batteries;
wherein the higher specified voltage value of each of the plurality of higher voltage batteries is lesser than 2.0 times the lower specified voltage value of any lower voltage battery selected from the plurality of lower voltage batteries.

6. The electric power system according to claim 5,
wherein each of the plurality of Zener diodes allows for the free flow of electricity in a first direction from the anode of the Zener diode to the cathode of the Zener diode;
wherein the plurality of Zener diodes prevents the flow of electricity in a second direction from the cathode to the anode as long as the voltage across the Zener diode from the cathode to the anode is lesser than the threshold voltage of the Zener diode;
wherein the plurality of Zener diodes allows for the free flow of electricity in the second direction when the voltage across the Zener diode is greater than the threshold voltage.

7. The electric power system according to claim 6, wherein each LED selected from the plurality of LEDs allows electric current to flow in a first direction from the anode of the selected LED to the cathode of the LED;

wherein each LED selected from the plurality of LEDs prevents electric current flow in a second direction from the cathode of the selected LED to the anode of the LED;

wherein each LED selected from the plurality of LEDs generates an illumination when an electric current is flowing through the selected diode in the first direction.

8. The electric power system according to claim 7, wherein each electric terminal selected from the plurality of voltage terminals electrically connects to the positive terminal of a battery selected from the plurality of batteries;

wherein each electric terminal selected from the plurality of voltage terminals forms an electrical connection that presents to the one or more electric loads a voltage potential between the positive terminal of the selected battery and the electrical ground of the regeneration circuit that is used to provide electrical energy to the one or more electric loads;

wherein each electric terminal selected from the plurality of voltage terminals electrically connects to a transfer connection selected from the plurality of transfer connections such that chemical potential energy can be exchanged between the battery electrically connected to the selected voltage terminal and the other batteries contained in the plurality of batteries.

9. The electric power system according to claim 8, wherein the feed diode is placed in series between the power distribution circuit and the regeneration circuit such that electricity will not flow from the power distribution circuit into the regeneration circuit.

10. The electric power system according to claim 9, wherein the plurality of higher voltage batteries comprises a first higher voltage battery, a second higher voltage battery, and a third higher voltage battery;

wherein the first higher voltage battery is a battery selected from the plurality of higher voltage batteries;

wherein the positive terminal of the first higher voltage battery electrically connects to the anode of the feed diode;

wherein the second higher voltage battery is a battery selected from the plurality of higher voltage batteries;

wherein the positive terminal of the second higher voltage battery electrically connects to the negative terminal of the first higher voltage battery;

wherein the third higher voltage battery is a battery selected from the plurality of higher voltage batteries;

wherein the positive terminal of the third higher voltage battery electrically connects to the negative terminal of the second higher voltage battery;

wherein the negative terminal of the third higher voltage battery electrically connects to the electrical ground of the regeneration circuit.

11. The electric power system according to claim 10, wherein the plurality of lower voltage batteries comprises a first lower voltage battery, a second lower voltage battery, and a third lower voltage battery;

wherein the first lower voltage battery is a battery selected from the plurality of lower voltage batteries;

wherein the positive terminal of the first lower voltage battery electrically connects to the first transfer connection;

wherein the second lower voltage battery is a battery selected from the plurality of lower voltage batteries;

wherein the positive terminal of the second lower voltage battery electrically connects to the negative terminal of the first lower voltage battery;

wherein the third lower voltage battery is a battery selected from the plurality of lower voltage batteries;

wherein the positive terminal of the third lower voltage battery electrically connects to the negative terminal of the second lower voltage battery;

wherein the negative terminal of the third lower voltage battery electrically connects to the electrical ground of the regeneration circuit.

12. The electric power system according to claim 11, wherein the plurality of transfer connections comprises a first transfer connection, a second transfer connection, a third transfer connection, a fourth transfer connection, and a fifth transfer connection;

wherein the plurality of Zener diodes comprises a first Zener diode, a second Zener diode, a third Zener diode, a fourth Zener diode, and a fifth Zener diode;

wherein the plurality of LEDs comprises a first LED, a second LED, a third LED, a fourth LED, and a fifth LED;

wherein the first transfer connection is the transfer connection that transfers electric current from the positive terminal of the first higher voltage battery into the positive terminal of the first lower voltage battery;

wherein the first transfer connection comprises the first Zener diode and the first LED;

wherein the cathode of the first Zener diode electrically connects the first transfer connection to the positive terminal of the first higher voltage battery;

wherein the cathode of the first LED electrically connects the first transfer connection to the positive terminal of the first lower voltage battery;

wherein the anode of the first Zener diode electrically connects to the anode of the first LED;

wherein the second transfer connection is the transfer connection that transfers electric current from the positive terminal of the first lower voltage battery into the positive terminal of the second higher voltage battery;

wherein the second transfer connection comprises the second Zener diode and the second LED;

wherein the cathode of the second Zener diode electrically connects the second transfer connection to the positive terminal of the first lower voltage battery;

wherein the cathode of the second LED electrically connects the second transfer connection to the positive terminal of the second higher voltage battery;

wherein the anode of the second Zener diode electrically connects to the anode of the second LED;

wherein the third transfer connection is the transfer connection that transfers electric current from the positive terminal of the second higher voltage battery into the positive terminal of the second lower voltage battery;

wherein the third transfer connection comprises the third Zener diode and the third LED;

wherein the cathode of the third Zener diode electrically connects the third transfer connection to the positive terminal of the second higher voltage battery;

wherein the cathode of the third LED electrically connects the third transfer connection to the positive terminal of the second lower voltage battery;

wherein the anode of the third Zener diode electrically connects to the anode of the third LED;

wherein the fourth transfer connection is the transfer connection that transfers electric current from the positive terminal of the second lower voltage battery into the positive terminal of the third higher voltage battery;

wherein the fourth transfer connection comprises the fourth Zener diode and the fourth LED;

wherein the cathode of the fourth Zener diode electrically connects the fourth transfer connection to the positive terminal of the second lower voltage battery;

wherein the cathode of the fourth LED electrically connects the fourth transfer connection to the positive terminal of the third higher voltage battery;

wherein the anode of the fourth Zener diode electrically connects to the anode of the fourth LED;

wherein the fifth transfer connection is the transfer connection that transfers electric current from the positive terminal of the third higher voltage battery into the positive terminal of the third lower voltage battery;

wherein the fifth transfer connection comprises the fifth Zener diode and the fifth LED;

wherein the cathode of the fifth Zener diode electrically connects the fifth transfer connection to the positive terminal of the third higher voltage battery;

wherein the cathode of the fifth LED electrically connects the fifth transfer connection to the positive terminal of the third lower voltage battery;

wherein the anode of the fifth Zener diode electrically connects to the anode of the fifth LED.

13. The electric power system according to claim 12, wherein the plurality of voltage terminals comprises a first voltage terminal, a second voltage terminal, a third voltage terminal, a fourth voltage terminal, a fifth voltage terminal, and a sixth voltage terminal;

wherein the first voltage terminal electrically connects to the positive terminal of the first higher voltage battery;

wherein the first voltage terminal presents the electric potential between the first voltage terminal and the electrical ground of the regeneration circuit to the one or more electric loads that is nominally three times the higher specified voltage value of the third higher voltage battery;

wherein the second voltage terminal electrically connects to the positive terminal of the second higher voltage battery;

wherein the second voltage terminal presents the electric potential between the second voltage terminal and the electrical ground of the regeneration circuit to the one or more electric loads that is nominally two times the higher specified voltage value of the third higher voltage battery;

wherein the third voltage terminal electrically connects to the positive terminal of the second higher voltage battery;

wherein the third voltage terminal presents the electric potential between the third voltage terminal and the electrical ground of the regeneration circuit to the one or more electric loads that is nominally equal to the higher specified voltage value of the third higher voltage battery;

wherein the fourth voltage terminal electrically connects to the positive terminal of the first lower voltage battery;

wherein the fourth voltage terminal presents the electric potential between the fourth voltage terminal and the electrical ground of the regeneration circuit to the one or more electric loads that is nominally three times the lower specified voltage value of the third lower voltage battery;

wherein the fifth voltage terminal electrically connects to the positive terminal of the second lower voltage battery;

wherein the fifth voltage terminal presents the electric potential between the fifth voltage terminal and the electrical ground of the regeneration circuit to the one or more electric loads that is nominally two times the lower specified voltage value of the third lower voltage battery;

wherein the sixth voltage terminal electrically connects to the positive terminal of the second lower voltage battery;

wherein the sixth voltage terminal presents the electric potential between the sixth voltage terminal and the electrical ground of the regeneration circuit to the one or more electric loads that is nominally equal to the lower specified voltage value of the third lower voltage battery.

14. The electric power system according to claim 13, wherein the regeneration circuit comprises a primary power source, an alternate power source, and a transfer port;

wherein the primary power source electrically connects to the transfer port;

wherein the alternate power source electrically connects to the transfer port;

wherein the transfer port is an electric port;

wherein the primary power source further comprises a national electric grid, an ac/dc converter, and a first transfer plug;

wherein the ac/dc converter further comprises a first positive terminal and an electrical ground;

wherein the national electric grid is a source of ac electric power;

wherein the ac/dc converter is an electric circuit that converts ac electric power into dc electric power;

wherein the first transfer plug is an electric plug;

wherein the first transfer plug inserts into the transfer port to electrically connect the ac/dc converter to the power distribution circuit;

wherein the transfer port electrically connects the first positive terminal of the ac/dc converter to the anode of the feed diode;

wherein the alternate power source further comprises a photovoltaic cell and a second transfer plug;

wherein the photovoltaic cell further comprises a second positive terminal and the electrical ground;

wherein the electrical ground of the ac/dc converter and the electrical ground of the photovoltaic cell share the same electric potential;

wherein the photovoltaic cell is a photoelectric device;

wherein the photovoltaic cell converts light directly into electric energy;

wherein the second transfer plug is an electric plug;

wherein the second transfer plug inserts into the transfer port to electrically connect the photovoltaic cell to the power distribution circuit;

wherein the transfer port further connects the second positive terminal of the photovoltaic cell to the anode of the feed diode.

* * * * *